United States Patent [19]

Hanrahan et al.

[11] Patent Number: 5,896,248
[45] Date of Patent: Apr. 20, 1999

[54] BOND PADS FOR METAL WELDING OF FLEXURE TO AIR BEARING SLIDER AND GROUNDING CONFIGURATION THEREOF

[75] Inventors: Kevin Patrick Hanrahan, Santa Barbara; Amanullah Khan, Temecula, both of Calif.

[73] Assignee: Read-Rite Corporation, Milpitas, Calif.

[21] Appl. No.: 08/924,584

[22] Filed: Sep. 5, 1997

[51] Int. Cl.⁶ .................. G11B 5/48; G11B 5/60; H01R 43/00
[52] U.S. Cl. .................. 360/104; 360/103; 360/108; 29/603.03
[58] Field of Search .................. 360/104, 103, 360/106, 108; 29/603.03

[56] References Cited

U.S. PATENT DOCUMENTS

| | | | |
|---|---|---|---|
| 4,761,699 | 8/1988 | Ainslie et al. | 360/103 |
| 4,789,914 | 12/1988 | Ainslie et al. | 360/104 |
| 5,491,597 | 2/1996 | Bennin et al. | 360/104 |
| 5,680,275 | 10/1997 | Frater et al. | 360/104 |
| 5,701,218 | 12/1997 | Boutaghou | 360/104 |
| 5,737,152 | 4/1998 | Balakrishnan | 360/104 |
| 5,768,062 | 6/1998 | Anderson et al. | 360/104 |
| 5,835,306 | 11/1998 | Bennin | 360/104 |
| 5,839,193 | 11/1998 | Bennin et al. | 360/104 |

*Primary Examiner*—Craig A. Renner
*Attorney, Agent, or Firm*—Nathan N. Kallman

[57] ABSTRACT

A magnetic head assembly has a plurality of slider electrical bond pads arranged in a first configuration on a top surface opposite the air bearing surface of a slider. A plurality of slider mechanical bond pads are arranged in a second configuration on the top surface of the slider. A plurality of flexure electrical bond pads are arranged in a third configuration on a bottom surface of a flexure. The third configuration and the first configuration are such that the slider electrical bond pads mate with the flexure electrical bond pads. A plurality of flexure mechanical bond pads are arranged in a fourth configuration on the bottom surface of the flexure. The fourth configuration and the second configuration are such that the slider mechanical bond pads mate with the flexure mechanical bond pads. Slider-to-flexure weld joints join the flexure electrical bond pads to the slider electrical bond pads. Slider-to-wire weld joints join the flexure mechanical bond pads to the slider mechanical bond pads.

13 Claims, 2 Drawing Sheets

BOND PADS FOR METAL WELDING OF FLEXURE TO AIR BEARING SLIDER AND GROUNDING CONFIGURATION THEREOF

CROSS-REFERENCE TO RELATED APPLICATION

The invention is related to copending application Ser. No. 08/600,240 entitled "Conductive Trace Flexure For A Magnetic Head Suspension Assembly" filed Feb. 12, 1996, assigned to the assignee of the present invention, which copending application is incorporated herein by reference.

The flexure design described in copending application Ser. No. 08/600,240 eliminates the conventional electrical wires and enables the realization of minimal spacing between the stacked disks or Z-height reduction, and the optimization of the ratio of air bearing stiffness to suspension stiffness.

1. Field of the Invention

This invention relates to thin film magnetic head suspension assemblies and in particular to bonding an air bearing slider to a flexure of a head suspension assembly and the electrical connections between the transducers of a slider and conductive traces.

2. Description of the Prior Art

Disk drives typically include a stack of spaced apart, concentric magnetic storage disks mounted on a common shaft, and an actuator arm assembly encased within a housing. The actuator arm assembly, which includes the head gimbal assembly (HGA), comprises a plurality of arms extending into spacings between the disks. Mounted on the distal end of each arm is a resilient suspension assembly which carries an air bearing slider. Included in the suspension assembly is a load beam, which is mounted at one end to the actuator arm by means of a base plate, and a flexure which is attached to the other end of the load beam and pivotally supports the slider.

The load beam biases the slider toward the surface of a magnetic recording disk, while the flexure provides flexibility for the slider. One or more thin film magnetic transducers are fabricated at a trailing edge of the slider to read or write on a magnetic disk.

In a conventional suspension, the electrical connection between a transducer and read/write driver electronics is made by twisted wires which run the length of the suspension load beam and extend over the flexure and slider. The ends of the wires are soldered or ultrasonically bonded to the transducer on the slider.

The current trend in disk drive manufacturing is toward miniaturization requiring a smaller overall disk drive height achieved by providing a lower stacking height of the head gimbal assembly (HGA).

SUMMARY OF THE INVENTION

An object of this invention is to reduce the stacking height of a head gimbal assembly.

A further object of this invention is to provide a new means of attaching a flexure to a slider in a magnetic head assembly.

In accordance with the present invention, a magnetic head assembly is fabricated in which a plurality of slider electrical bond pads and a plurality of slider mechanical bond pads are formed on a top surface of the slider that is opposite to an air bearing surface (ABS) of the slider. A plurality of flexure electrical bond pads are formed on a bottom surface of a flexure. The flexure electrical bond pads and the slider electrical bond pads are joined by welding. A plurality of flexure mechanical bond pads are formed on the bottom surface of the flexure and are joined by welding to slider mechanical bond pads. Slider-to-wire weld joints join the flexure electrical bond pads to the slider electrical bond pads and slider-to-flexure weld joints join the flexure mechanical bond pads to the slider mechanical bond pads. The slider electrical bond pads are connected to a transducer in the slider. In accordance with the invention, the plurality of slider mechanical bond pads are connected to a gimbal pad adapted to contact a dimple through a hole in the flexure.

BRIEF DESCRIPTION OF THE DRAWINGS

The invention will be described in greater detail with reference to the drawings in which.

In these Figures, similar numerals refer to similar elements in the drawing. It should be understood that the sizes of the different components in the Figures may not be to scale, or in exact proportion, and are shown for visual clarity and for the purpose of explanation.

DETAILED DESCRIPTION OF THE INVENTION

Figure 1:
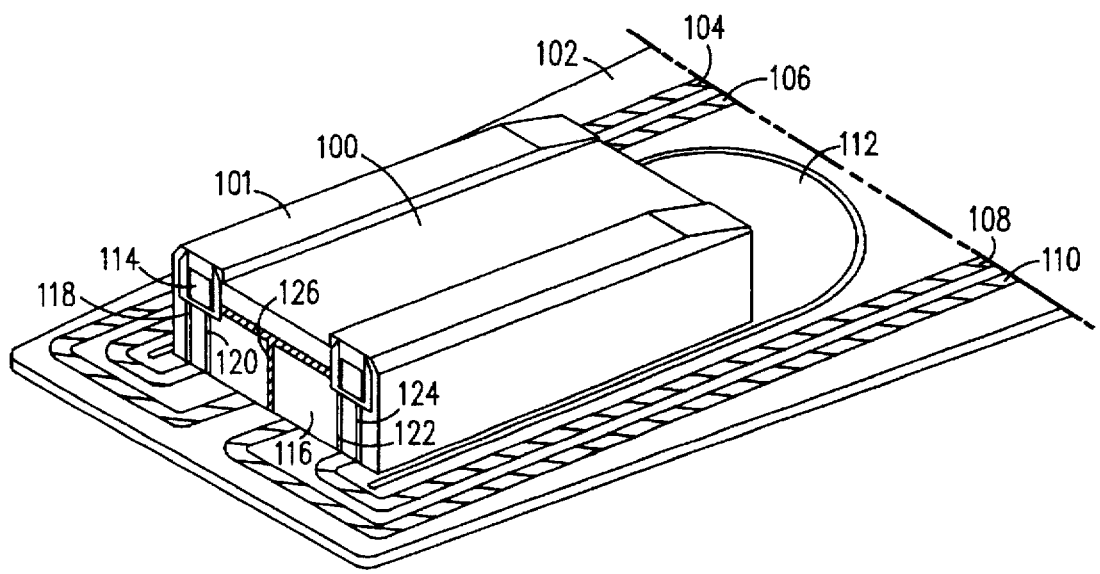
FIG. 1 is a perspective view of the forward section of a flexure and a slider with the ABS facing up, made in accordance with the present invention.
Figure 2:
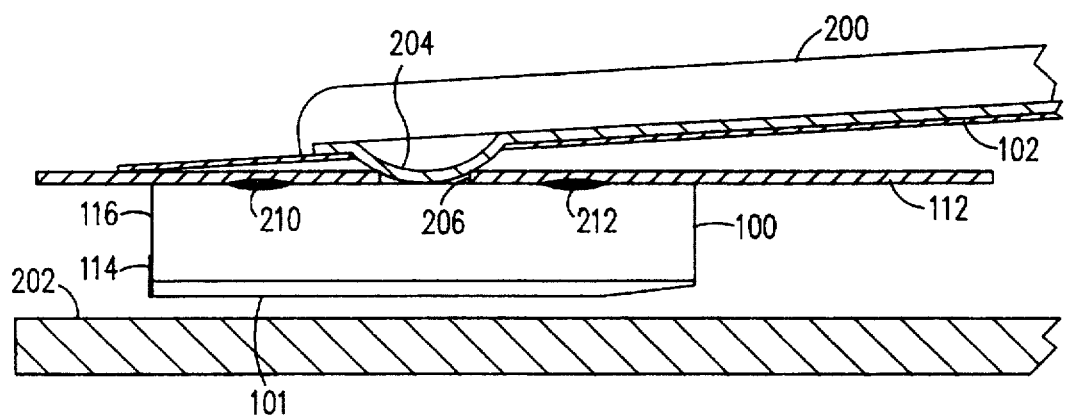
FIG. 2 is a partial cross-sectional view of the forward section of a head suspension illustrating the position of a flexure and a slider with the ABS facing a rotary disk.

As described above, a disk drive includes an actuator arm assembly and a stack of spaced apart disks rotatable about a common shaft. The actuator arm assembly is rotatable about an actuator arm axis. The arm assembly includes a plurality of actuator arms which extend into spacings between the disks. As shown in FIGS. 1 and 2, a magnetic head suspension assembly is attached to each of the actuator arms, which includes a slider 100 having an air bearing surface (ABS) 101 and a flexure 102. The slider supports a thin film transducer at its trailing end formed with a magnetic yoke and an electrical coil that is insulated from and coacts inductively with the magnetic yoke. The ends of the coil are brought out to bond pads on an external surface of the slider so that a wire harness that connects to read/write circuitry can be soldered to the coil.

Each magnetic head suspension assembly includes a load beam 200 for supplying a directed force to a slider 100, so as to maintain the slider in a balanced equilibrium position at a desired height above a disk surface 202. The flexure 102 is secured to the load beam 200, and is formed with a flexible laminate comprised of a pattern of conductive traces 104, 106, 108, 110. The conductive traces are made of copper, and the laminate is made of a polymeric resinous material, such as polyimide. The traces are held in place, and electrically insulated by a compliant dielectric material. These conductive traces are patterned to provide sufficient agility in various degrees of movement and stiffness to resist physical deformation, for imparting optimal mechanical and structural support to the slider and to the load beam, and further for electrically connecting the slider to remotely located read/write electronic circuitry.

The flexure 102 is attached to the load beam 200 by welding or gluing. The rearward section of the flexure extends toward the actuator arm assembly for connection to read/write electronic circuitry. Wires in the flexure 102 are attached to the slider by an ultrasonic or resistance weld 210 between electrical bond pads on the slider and the flexure. The flexure 102 is attached to the slider by an ultrasonic or resistance weld 212 between mechanical bond pads on the slider and the flexure.

Figure 3:
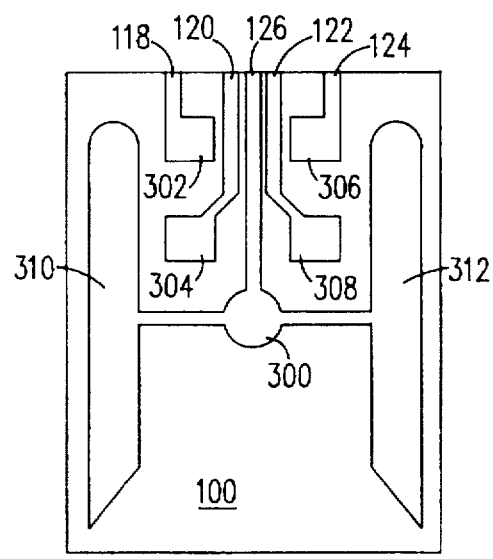
FIG. 3 is a top plan view of the slider of FIG. 1.

As shown in FIG. 1, a tongue 112 is formed in the flexure 102. The slider 100 is attached to the tongue 112 as shown in FIG. 2. A dimple 204 is formed in the load beam 200, and is urged against a gimbal pad on the top surface of the slider 100 through a dimple clearance hole 206 formed in the tongue 112, and contributes to the gimbaling action. Transducer 114 is disposed at the trailing end 116 of the slider 100. Wire traces 118, 120, 122, 124, are made of insulated copper to make the transducer to pad connections as shown in FIG. 3. A ground trace 126 connects the transducer to the top surface of the slider 100 which includes a conductive contact pad at ground potential.

FIG. 3 illustrates four electrical bond pads 302, 304, 306, 308, which are gold plated exposed copper that are provided on the top surface of the slider. Two mechanical bond pads 310, 312, of exposed copper, are provided for ultrasonic or resistance welding to the flexure. A gimbal pad 300 is provided of exposed copper to provide a contact point for a dimple. The gimbal pad 300, and the mechanical bond pads 310, 312, are connected together to provide, by ground trace 126, a ground connection to the transducer 114. Wire traces 118, 120, 122, 124 are formed of insulated copper to make the sensor to pad connections by ultrasonic or resistance welding as shown in FIG. 1.

Figure 4:
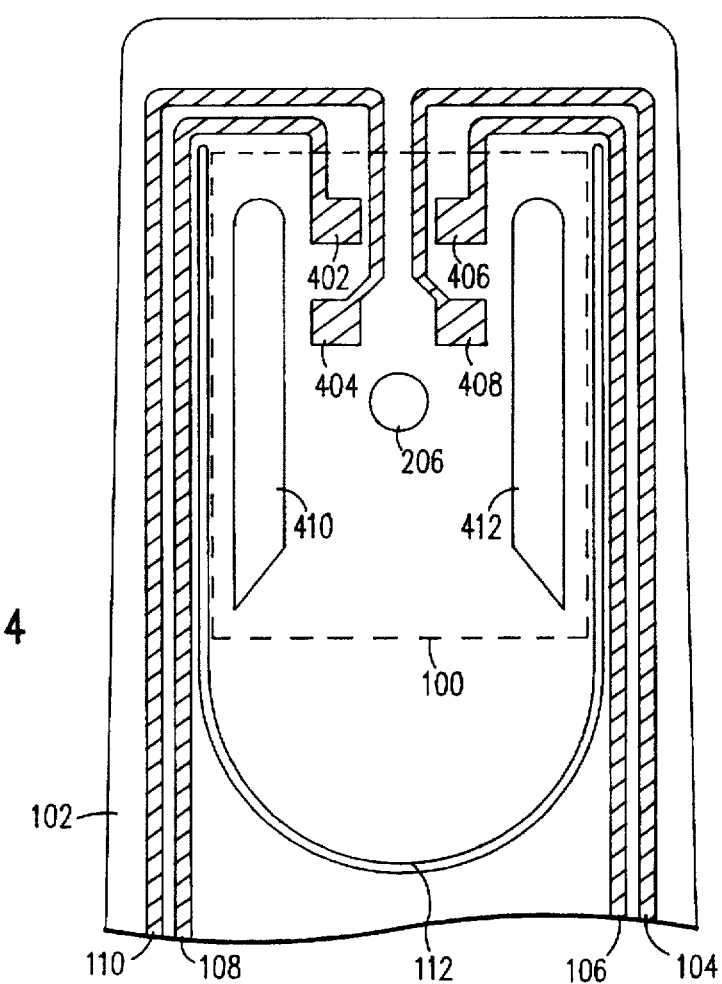
FIG. 4 is an enlarged bottom plan view of the flexure of FIG. 1.

In FIG. 4, the flexure 102 is formed of a flexible laminate comprised of a pattern of conductive traces 104, 106, 108, 110, that are retained and electrically insulated by a compliant dielectric layer, as described in copending application Ser. No. 08/600,240. The dielectric layer is a flat, flexible sheet of material bonded to the patterned conductive traces 104, 106, 108, 110. The dielectric layer is made of plastic or a polymeric resinous material, such as polyimide, and is bonded by means of a glue layer, for example, to the conductive traces. The tongue 112 has a dimple clearance hole 206.

The conductive traces 104, 106, 108, 110 are preferably made of copper, due to its desirable conductivity and tensile modulus. The conductive traces 104, 106, 108, 110 and the bottom surface of the flexure 102 are coated with an insulated layer in order to prevent the conductive traces from shorting.

Four electrical bond pads 402, 404, 406, 408, of exposed copper, are provided at the bottom surface of the flexure 102. The bottom surface of the flexure 102 is the surface of the flexure that is affixed to the top surface of the slider. Two mechanical bond pads 410, 412, of exposed copper, are also provided. The configuration of the electrical and mechanical bond pads on the flexure is such that the bond pads 402, 404, 406, 408, 410, 412, of the flexure mate with corresponding electrical and mechanical bond pads 302, 304, 306, 308, 310, 312 (FIG. 3) on the slider for ultrasonic or resistance welding to the slider.

The flexure 102 provides sufficient flexibility in various degrees of movement for accommodating the uneven topology of the disk surface 202, while the slider 100 is flying over the disk, and yet is sufficiently stiff to resist any physical deformation that may be caused by the rapid movements of the actuator arm assembly. For this purpose, the conductive traces 104, 106, 108, 110 are patterned so as to impart optimal mechanical and structural support to the slider 100 and the load beam 200.

Figure 5:
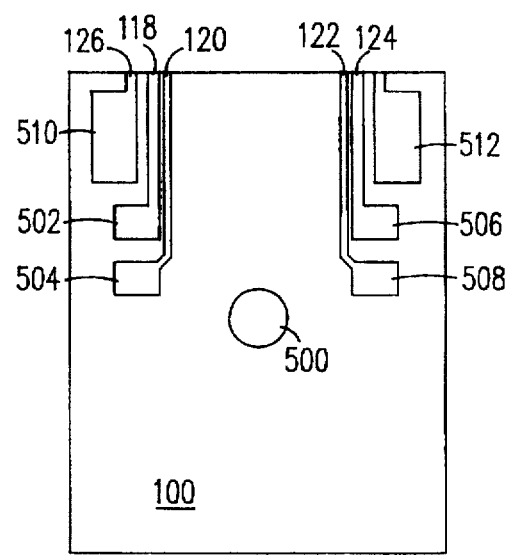
FIG. 5 is a top plan view of an alternative pattern for the bonding pads of the slider of FIG. 1

In FIG. 5, four electrical bond pads 502, 504, 506, 508, which are gold plated exposed copper, are provided on the top surface of the slider. Two mechanical bond pads 510, 512 of exposed copper are provided for ultrasonic or resistance welding to the flexure. A gimbal pad 500 of exposed copper provides a contact point for a dimple. The mechanical bond pads 510, 512 are connected, by ground trace 126, to ground connection of the transducer 114. Wire traces 118, 120, 122, 124, are covered copper to make the sensor to pad connections, as in FIG. 1.

There has been disclosed herein an assembly of a magnetic head suspension wherein bond pads formed on the top surface of a slider allow a flexure to be welded to the slider by ultrasonic or resistance welding, for example. By virtue of this invention, welding electrical and mechanical bond pads results in reduced spacing between the flexure and the slider. A more solid weld joint between the slider and flexure is achieved than with prior art epoxy technology. The use of epoxy to bond the slider and flexure together is eliminated and thereby makes obsolete several cumbersome processes and expensive pieces of equipment. A stronger weld is obtained that allows for a smaller slider to flexure bond area and facilitates innovations on the top surface of the slider such as trace suspension assemblies or integrated wires. The slider-to-wire and slider-to-flexure welds take place at the same time and thereby reduce handling and the need for additional equipment. Therefore, lower manufacturing cost of head suspension assemblies is realized.

It should be understood that the invention is not limited to the specific parameters, materials and embodiments described above. Various modifications and variations may be made within the scope of the present invention.

What is claimed is:

1. A magnetic head assembly comprising:

an air bearing slider supporting a thin film magnetic transducer;

a ground trace electrically connected to said transducer;

a plurality of slider electrical bond pads arranged in a first configuration on a top surface of said slider;

a plurality of slider mechanical bond pads arranged in a second configuration on said top surface of said slider;

a gimbal pad electrically connected to said ground trace and said plurality of slider mechanical bond pads;

a flexure supporting said slider and having a hole formed therein;

said gimbal pad contacting a load beam dimple extending into said hole whereby an electrical ground connection is established;

a plurality of flexure electrical bond pads arranged in a third configuration on a bottom surface of said flexure;

said third configuration and said first configuration being such that said slider electrical bond pads mate with said flexure electrical bond pads; and a plurality of flexure mechanical bond pads arranged in a fourth configuration on said bottom surface of said flexure;

said fourth configuration and said second configuration being such that said slider mechanical bond pads mate with said flexure mechanical bond pads;

slider-to-wire welds joining said flexure electrical bond pads to said slider electrical bond pads; and slider-to-flexure welds joining said flexure mechanical bond pads to said slider mechanical bond pads.

2. The magnetic head assembly of claim 1 wherein said plurality of slider electrical bond pads are connected to said transducer of said slider.

3. The magnetic head assembly of claim 1 wherein said welds are ultrasonic welds.

4. The magnetic head assembly of claim 1 wherein said welds are resistance welds.

5. A method of making a magnetic head assembly comprising the steps of:

depositing a plurality of slider electrical bond pads arranged in a first configuration and a plurality of slider mechanical bond pads arranged in a second configuration on a top surface of a slider, said top surface being opposite an air bearing surface of said slider;

electrically connecting a transducer on said slider to a ground trace and to said plurality of slider electrical bond pads;

electrically connecting a gimbal pad to said ground trace and to said plurality of slider mechanical bond pads;

fabricating a plurality of flexure electrical bond pads arranged in a third configuration and a plurality of flexure mechanical bond pads arranged in a fourth configuration on a bottom surface of a flexure, and a hole in said flexure;

said third configuration and said first configuration being such that said slider electrical bond pads mate with said flexure electrical bond pads;

said fourth configuration and said second configuration being such that said slider mechanical bond pads mate with said flexure mechanical bond pads; and placing said top surface of said slider and said bottom surface of said flexure together such that said slider electrical bond pads mate with said flexure electrical bond pads, said slider mechanical bond pads mate with said flexure mechanical bond pads, and said gimbal pad contacts a load beam dimple extending into said hole whereby an electrical ground connection is established.

6. The method of claim 5 further comprising the step of:

welding said flexure electrical bond pads to said slider electrical bond pads and said flexure mechanical bond pads to said slider mechanical bond pads.

7. The method of claim 6 wherein said welding is ultrasonic welding.

8. The method of claim 6 wherein said welding is resistance welding.

9. A thin film magnetic head assembly comprising:

an air bearing slider having an air bearing surface and a top surface opposite said air bearing surface, said slider having a trailing end;

at least one transducer formed on said trailing end;

a ground trace electrically connected to said transducer;

said slider having first and second metal traces routed from said transducer to said top surface of said slider;

said slider having first and second slider electrical bond pads on said top surface attached to said first and second metal traces, respectively;

said slider having first and second slider mechanical bond pads on said top surface;

a gimbal pad electrically connected to said ground trace and said first and second slider mechanical bond pads;

a flexure having a top side attached to a load beam, a bottom side with third and fourth metal traces thereon, and a hole formed therein;

said gimbal pad contacting a load beam dimple extending into said hole whereby an electrical ground connection is established;

first and second flexure electrical bond pads on said bottom side attached to said third and fourth metal traces, respectively; and first and second flexure mechanical bond pads on said bottom side attached to said flexure;

said bond pads having a pattern so that said slider electrical bond pads mate with said flexure electrical bond pads and said slider mechanical bond pads mate with said flexure mechanical bond pads.

10. The magnetic head assembly of claim 9 further comprising weld joints that join said slider electrical bond pads with said flexure electrical bond pads and said slider mechanical bond pads with said flexure mechanical bond pads.

11. The magnetic head assembly of claim 10 wherein said first and second slider electrical bond pads are connected to said transducer.

12. The magnetic head assembly of claim 10 wherein said weld joints are ultrasonic welds.

13. The magnetic head assembly of claim 10 wherein said weld joints are resistance welds.

* * * * *